United States Patent  [10] Patent No.: US 7,814,374 B2
Balazich et al.  (45) Date of Patent: Oct. 12, 2010

(54) SYSTEM AND METHOD FOR THE CAPTURE AND PRESERVATION OF INTERMEDIATE ERROR STATE DATA

(75) Inventors: Douglas Balazich, Poughkeepsie, NY (US); Michael Billeci, Poughkeepsie, NY (US); Anthony Saporito, Highland, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 11/625,006

(22) Filed: Jan. 19, 2007

(65) Prior Publication Data

US 2008/0178048 A1 Jul. 24, 2008

(51) Int. Cl.
*G06F 11/00* (2006.01)
(52) U.S. Cl. .................................. 714/48
(58) Field of Classification Search ............. 714/48
See application file for complete search history.

(56) References Cited

U.S. PATENT DOCUMENTS

| 5,410,710 | A | 4/1995 | Sarangdhar et al. |
| 5,446,743 | A | 8/1995 | Zook |
| 5,862,151 | A | 1/1999 | Fagerness |
| 5,991,898 | A | 11/1999 | Rajski et al. |
| 6,574,748 | B1 | 6/2003 | Andress et al. |
| 6,668,308 | B2 | 12/2003 | Barroso et al. |
| 6,742,145 | B2 | 5/2004 | Bailey et al. |
| 6,857,083 | B2 | 2/2005 | Floyd et al. |
| 2008/0126830 | A1 * | 5/2008 | Balazich et al. ............ 714/2 |

FOREIGN PATENT DOCUMENTS

EP  1 416 377  5/2004

* cited by examiner

*Primary Examiner*—Robert Beausoliel
*Assistant Examiner*—Amine Riad
(74) *Attorney, Agent, or Firm*—Cantor Colburn LLP; John Campbell

(57) ABSTRACT

A multiprocessor chip system having the capability to capture and preserve intermediate machine error state data, wherein the system comprises a second level cache, wherein the second level cache is commonly interfaced with a primary and secondary processing core, and at least two primary error event registers, wherein each primary error event register is logically associated to a respective processing core. Further, at least two secondary error event registers, wherein each secondary error event register is logically associated to a respective processing core, and at least two sub-primary error accumulation registers, wherein each sub-primary error accumulation register is logically associated to a respective primary error event register and a secondary error event register.

14 Claims, 3 Drawing Sheets

SYSTEM AND METHOD FOR THE CAPTURE AND PRESERVATION OF INTERMEDIATE ERROR STATE DATA

BACKGROUND OF THE INVENTION

1. Field of the Invention

This invention relates to multiprocessing system fault-tolerance design, and particularly to the capture and preservation of intermediate machine error state data.

2. Description of Background

Before our invention complex error scenarios involving multiprocessor core machines, required extensively detailed analysis to assist in determining the cause of the systematic error. Conventionally, diagnostic proceedings were accomplished via the utilization of hardware that was exclusively dedicated to the functions of capturing, and preserving the error state information that was generated within a machine. Further, the error state information obtained from the machine was subsequently used by the dedicated hardware to initiate a machine correction recovery action in order to remedy the error condition.

By and large, the above-mentioned diagnostic repair and recovery approach was suitable for application to a wide variety of systematic machine error scenarios. However, there are particular instances wherein certain types of errors may occur that result in the need for substantially high levels of recovery action procedures. In these instances it is very often necessary to capture and comprehend a specific sequence of errors that has occurred, and thus led to the subsequent high levels of systematic recovery procedures. The present invention offers a solution to this problem by adding a redundant level of systematic error analysis through implementing an error accumulation register that is to be used in conjunction with existing error accumulation registers. The primary function of the additional register being to serve as a data collection point within a system that functions to capture error state date that is generated beyond any identified initial error state data, wherein subsequently the additionally acquired error state data is used to assist in error analysis operations.

SUMMARY OF THE INVENTION

The shortcomings of the prior art are overcome and additional advantages are provided through the provision of a multiprocessor chip system having the capability to capture and preserve intermediate machine error state data, wherein the system comprises a second level cache, wherein the second level cache is commonly interfaced with a primary and a secondary processing core, and at least two primary error event registers, wherein each primary error event register is logically associated to a respective processing core. Further, at least two secondary error event registers, wherein each secondary error event register is logically associated to a respective processing core, and at least two sub-primary error event registers, wherein each sub-primary error accumulation register is logically associated to a respective primary error event register and a secondary error event register.

A further aspect of the present invention relates to a method for the capture and preserve intermediate machine error state data, the method further comprising the steps of associating a sub-primary error accumulation register with a primary error event register and a secondary error event register, and configuring the primary error event register to capture data relating to an initial error state. The method further provides for configuring the sub-primary error accumulation register to capture the identical error state data that is captured at the primary error event register, and acquiring initial error state data at the primary error event register, and the sub-primary error accumulation register.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Currently there are multitudes of processing system being produced that have multiple processors cores that are situated on a single chip. Due in part to the shared allocation of resources, on occasion complex machine state error scenarios arise. Thus, the complex machine state error scenarios require a detailed analysis of the machine state errors in order to determine the cause of the error action, and the subsequently, appropriate recovery action to remedy the machine state error. Within aspects of the present invention, this functionality is accomplished by the use of dedicated hardware systems, wherein the dedicated hardware systems capture and preserve machine state error data. The captured machine state error data is utilized by the dedicated hardware system to initiate corrective system recovery actions. However, there are particular machine state errors that may arise that require more aggressive recovery actions. In these instances it is necessary to specifically comprehend the specific sequence of error activity that has occurred in order to devise a higher than usual level of recovery actions that will be used to remedy the particular error activity.

Figure 1:
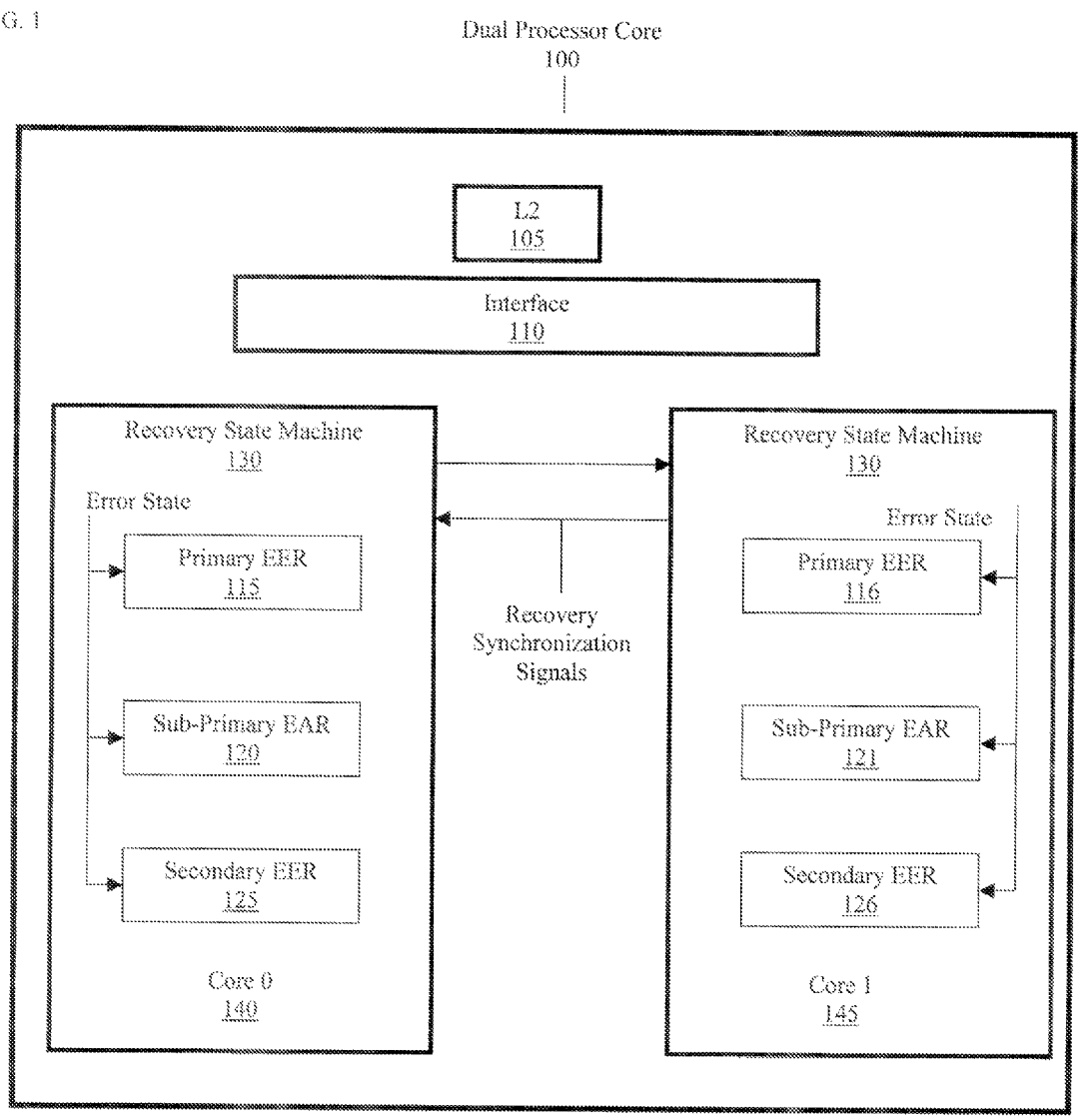
FIG. 1 illustrates one example of aspects of a multiprocessor chip that can be implemented within embodiments of the present invention.

Turning now to the drawings in greater detail, it will be seen that in FIG. 1 there is a block diagram of a dual processing core system 100 of a multiprocessor chip. For the sake of simplicity the key processing components utilized within aspects of the present invention are detailed in a discontinuous format. As shown, two CPU cores (CPU$_0$, CPU$_1$) 140, 145 are associated and in communication with a logically shared second level cache L2 105. The second level cache L2

105 is further associated and in communication with an intra-chip interface module 110. Within aspects of the present invention, a distinct primary error event register 115, 116, a sub-primary error accumulation register 120, 121, and a secondary error event register 125, 126 are logically associated with each CPU core 140, 145. Further comprised are dedicated hardware system recovery state machines 130, 131, wherein a distinctive state recovery machine 130 is logically associated with each CPU core 140, 145. The intra-chip interface module 110 serves as a communication adjunct between the differing components.

Within aspects of the present invention a sub-primary error accumulation register 120, 121 is used to capture machine state error data between the locking of a first/primary error event register 115, 116 up until the time period that a secondary error event register 125, 126 is enabled. The distinct advantage of capturing machine state error data in the time period between the detection of an initial error activity and a last recovery reset event (i.e., a id cache reset) is to capture and preserve any additional machine state error information that may concurrently arise during the execution of the recovery process actions prior to a checkpoint refreshing activity that is initiated when the secondary error event register 125, 126 is enabled.

The additional machine state data that is collected in the sub-primary error accumulation register 120, 121 is representative of the time period that the system state recovery actions of the drainage of the execution pipe of a core 140 and 145, and the release of a store queue is performed for each processing core 140, 145. Machine error state data that is collected during this time period can subsequently be analyzed, and utilized to assist in explaining particular instances when higher than expected levels of machine state recovery actions are undertaken than were initially expected based upon the initial machine state error data that was captured at the primary error event register 115, 116.

Specifically, aspects of the present invention implement capture and hold latches that are used to shadow the collection procedure of a primary whose-on-first/error event register 115, 116. The primary whose-on-first (WOF) register having a common lock mechanism that prevents the capturing of any new machine state error data once data relating to an initial error has been collected. Accordingly, the latches that are utilized to shadow the primary WOF register/error event register 115, 116, capture the identical information that is captured at the primary WOF register/error event register 115, 116, and in addition to any new machine state error data that is generated after the locking of the primary WOF register/error event register 115, 116 up until a recovery reset event occurs. The recovery reset event being utilized as a common lock for the latches that form the sub-primary error accumulation register 120, 121. Subsequently, within aspects of the present invention, a sub-primary error accumulation register 120, 121 lock can be cleared by way of a variety of conventional actions.

Figure 2:
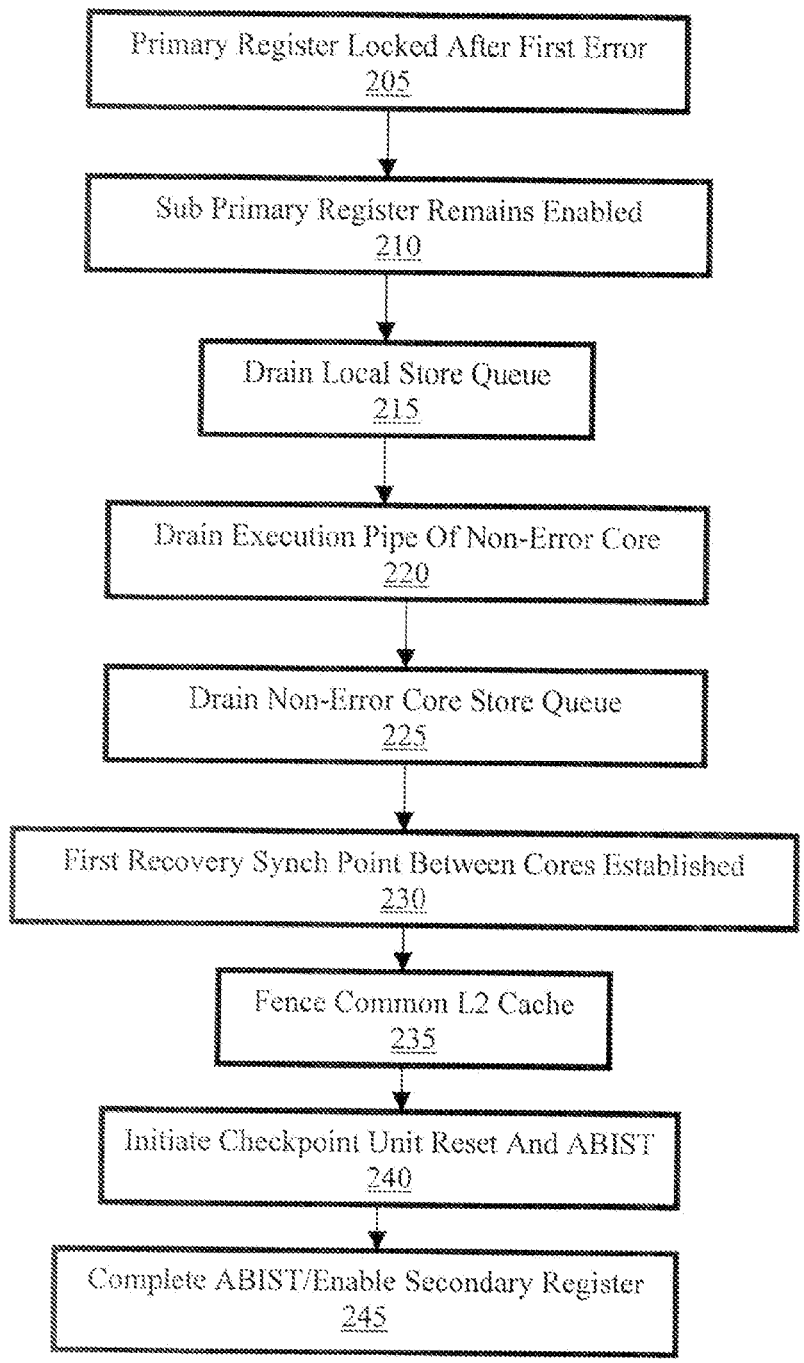
FIG. 2 illustrates a flow chart detailing aspects of an intermediate error data accumulation methodology that can be implemented within aspects of the present invention.

FIG. 2 shows a flow diagram illustrating a system error recovery process that can be implemented within aspects of the present invention. Within aspects of the present invention a sub-primary error accumulation register 120, 121 is used to shadow the machine state error collection activities of a primary error event register 115, 116. As implemented, the sub-primary error accumulation registers 120, 121 continue to accumulate additional machine state error data after the locking of the primary error event register 115, 116, and up until the enablement of the secondary error event register 125, 126. This intermediate error data accumulation time period covers the potential non-collection window of time between the locking of the primary error event register 115, 116, and the activation of the secondary error event register 125, 126.

As shown in FIG. 2, recovery steps for the capture of intermediate error state data is initiated at step 205, with the capture of the initial error state data by the primary error event register 115, 116. At step 210, the sub-primary error accumulation register 120, 121 remains enabled, and thus able to further capture machine state error data. Next, at step 215, the local store queue of the affected CPU core 140, 145 is drained, while concurrently the execution pipe of the non-affected CPU core 140, 145 is drained (step 225). As a result of the previous actions, at step 230, a first recovery synchronization point is established between the CPU cores 140, 145, and a common fence is initiated within the cache L2 105.

At step 240, a checkpoint unit reset is initiated, and an automatic built-in self-test (ABIST) is initiated within the affected processing system. Upon the completion of the ABIST, the secondary error event register 125, 126 is enabled to further capture any additional machine state error data, and the sub-primary error accumulation register 120, 121 is thereafter placed in a locked condition. Thus, the intermediate error data accumulation time period of the flow chart of FIG. 2 covers the potential non-collection window of time between the locking of the primary error event register 115, 116, and the enablement of the secondary error event register 125, 126.

Figure 3:
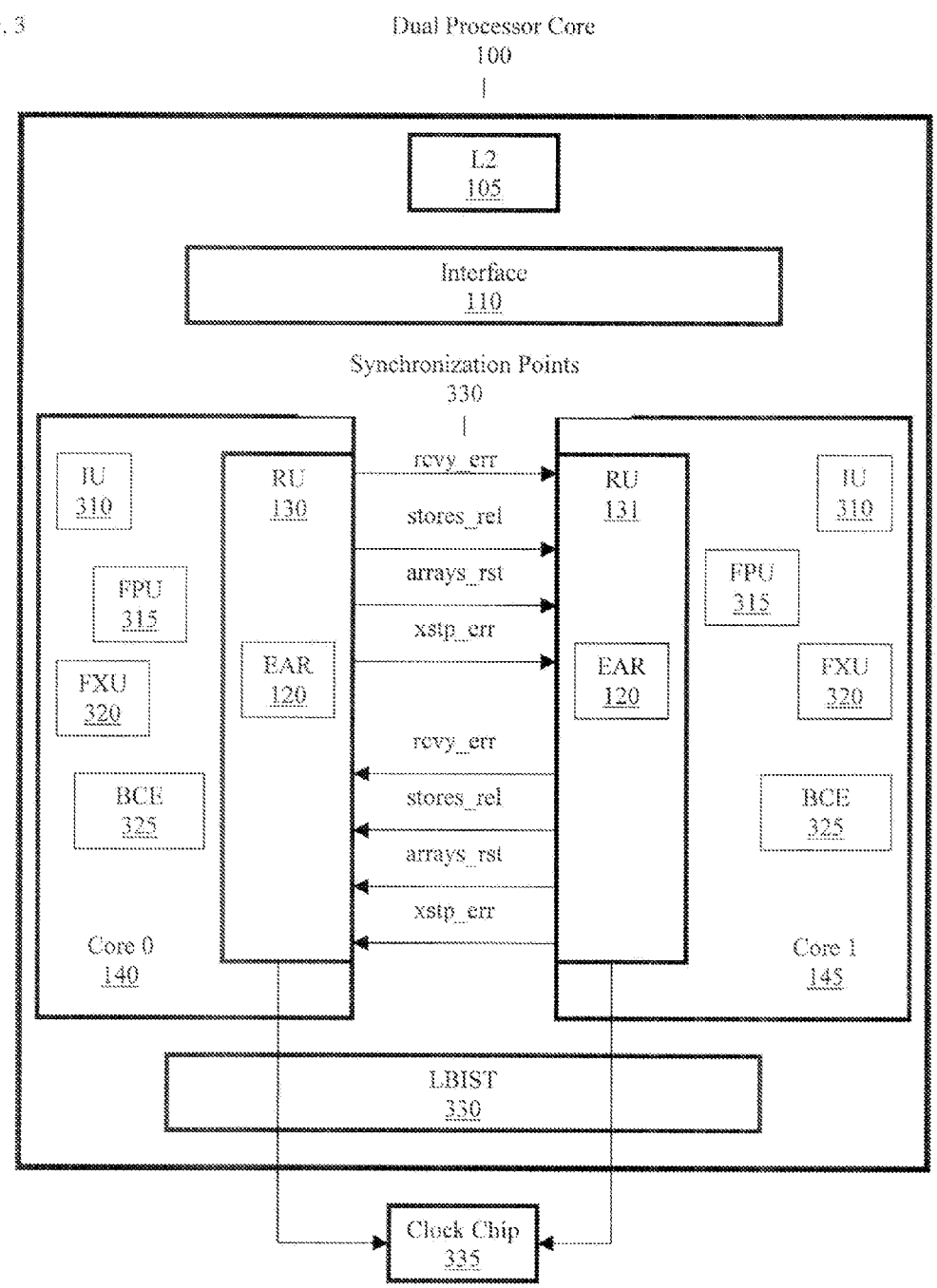
FIG. 3 illustrates one example of aspects of a multiprocessor chip that can be implemented within embodiments of the present invention detailing specific synchronization points.

FIG. 3 is a block diagram of a dual processing core system 100 of a multiprocessor chip. As shown, the dual processing core system 100 consists of several units that form the central processor cores 140, 145 of the system. These functional units comprised within each core 140, 145 are the instruction unit (IU) 310; the floating-point unit (FPU) 315; the fixed-point unit (FXU) 320; the branch control element unit (BCE) 325, and the register checkpoint unit (RU) 130, 131, the RU used for full system error checking, and processor recovery. The RUs 130, 131, also serve as the functional seat for the sub-primary error accumulation registers 120, 121. The RUs 130, 131 are also associated with and in communication with a clock chip 335. The dual core processor also comprises a logic built-in self-test (LBIST) 330.

As mentioned above, the sub-primary error accumulation registers 120, 121 capture additional machine state error information for the time period between the locking of primary error event register 115, 116 and the store queue drain of both cores, up to a second dual core synchronization point. The synchronization points 330 shown in FIG. 3 illustrate examples of recovery actions and error state data that is generated during these recovery actions, wherein the machine state error data generated during the recovery actions is saved at the sub-primary error accumulation register 120, 121. For example, an initial recoverable error (rcvy_err) has been detected on one core 140, 145 and thereafter escalates to a checkstop procedure (xstp_err). As shown, in the time period after the detection of the error (rcvy_err), the system further goes through the functions of attempting to drain the local store queue of a core 140, 145, wherein if this function is not completed then the error is escalated (stores_rel). Also performed in the intermediate time period is a built-in system self-test operation (arrays_rst) that is performed upon the cores 140, 145. If upon the initiation of the checkstop (xstp_err) the result of any intermediately performed operation indicates that a machine state error has escalated in any way then, the information that has been captured during the intermediate period between the locking of the primary error event register 115, 116 and the enablement of the secondary error event register 125, 126 will be of utmost importance to assist in any subsequent system diagnostic and recovery actions implemented within a system.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A multiprocessor chip system having the capability to capture and preserve intermediate machine error state data, wherein the system comprises:
    at least two primary error event registers, wherein each primary error event register is logically associated to a respective primary and a secondary processing core;
    at least two secondary error event registers, wherein each secondary error event register is logically associated to a respective processing core; and
    at least two sub-primary error accumulation registers, wherein each sub-primary error accumulation register is logically associated with a respective primary error event register and a secondary error event register.

2. The system of claim 1, wherein a sub-primary error accumulation register is configured to operate in parallel with the respective primary error event register to which the sub-primary error accumulation register is logically associated.

3. The system of claim 2, wherein the sub-primary error accumulation register is configured to capture identical initial error state data as the respective primary error event register to which the sub-primary error accumulation register is logically associated, the respective primary error event register being placed in a locked state after the capture and storage of the initial error state data.

4. The system of claim 3, wherein the sub-primary error accumulation register is configured to continue capturing error state data after the respective primary error event register to which it has been logically associated with has been placed in a locked state.

5. The system of claim 4, wherein the sub-primary error accumulation register is placed in a lock state upon the enablement of the secondary error event register to which the sub-primary error accumulation register is logically associated.

6. A method for the capture and preservation of intermediate machine error state data, the method further comprising the steps of:
    associating a sub-primary error accumulation register with a primary error event register, and a secondary error event register;
    configuring the primary error event register to capture data relating to an initial error state;
    configuring the sub-primary error accumulation register to capture the identical error state data that is captured at the primary error event register;
    acquiring initial error state data at the primary error event register, and the sub-primary register.

7. The method of claim 6, further comprising the step of placing the primary error event register in a locked state upon the capture of data relating to the initial error state.

8. The method of claim 7, further comprising the step of placing the sub-primary error accumulation register in a locked state upon the enablement of the secondary error event register.

9. The method of claim 8, wherein the sub-primary error accumulation register continues to capture error state data in the time period after the locking of the primary error event register.

10. The method of claim 9, wherein the sub-primary error accumulation register is placed in a locked state upon the enablement of the secondary error event register.

11. A multiprocessor chip system having the capability to capture and preserve intermediate machine error state data, wherein the system comprises:
    a second level cache, wherein the second level cache is commonly interfaced with a primary and a secondary processing core;
    at least two primary error event registers, wherein each primary error event register is logically associated to a respective processing core;
    at least two secondary error event registers, wherein each secondary error event register is logically associated to a respective processing core; and
    at least two sub-primary error accumulation registers, wherein each sub-primary error accumulation register is logically associated with a respective primary error event register and a secondary error event register, and further, each sub-primary error accumulation register is configured to operate in parallel with the respective primary error event register to which the sub-primary error accumulation register is logically associated.

12. The system of claim 11, wherein the sub-primary error accumulation register is configured to capture identical initial error state data as the respective primary error event register to which the sub-primary error accumulation register is logically associated, the respective primary error event register being placed in a locked state after the capture and storage of the initial error state data.

13. The system of claim 12, wherein the sub-primary error accumulation register is configured to continue capturing error state data after the respective primary error event register to which it has been logically associated with has been placed in a locked state.

14. The system of claim 13, wherein the sub-primary error accumulation register is placed in a lock state upon the enablement of the secondary error event register to which the sub-primary error accumulation register is logically associated.

* * * * *